(12) United States Patent
Ito et al.

(10) Patent No.: US 8,172,341 B2
(45) Date of Patent: May 8, 2012

(54) VEHICULAR ANTI-LOCK CONTROL SYSTEM (75) Inventors: Yuki Ito, Saitama (JP); Osamu Yamamoto, Saitama (JP); Naoto Ohkubo, Saitama (JP); Hiromi Inagaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 728 days.

(21) Appl. No.: 11/592,015

(22) Filed: Nov. 2, 2006

(65) Prior Publication Data
US 2007/0114839 A1   May 24, 2007

(30) Foreign Application Priority Data

Nov. 24, 2005   (JP) ................................. 2005-338728

(51) Int. Cl.
B60T 8/58 (2006.01)
(52) U.S. Cl. ..................... 303/158; 303/119.3; 303/154; 701/71
(58) Field of Classification Search ............. 303/119.3, 303/122, 149–150, 154, 158, 163, 167; 701/70, 701/71, 78, 82
See application file for complete search history.

(56) References Cited

U.S. PATENT DOCUMENTS

| | | | | |
|---|---|---|---|---|
| 5,312,170 A | * | 5/1994 | Erban et al. | 303/150 |
| 5,372,412 A | * | 12/1994 | Yagi | 303/115.2 |
| 5,407,259 A | | 4/1995 | Itabashi et al. | |
| 5,765,929 A | * | 6/1998 | Hirano et al. | 303/112 |
| 5,927,831 A | * | 7/1999 | Friederichs et al. | 303/156 |
| 6,015,192 A | * | 1/2000 | Fukumura | 303/140 |
| 6,520,601 B1 | * | 2/2003 | Kahl et al. | 303/167 |
| 6,728,620 B2 | | 4/2004 | Anwar | |
| 2003/0218379 A1 | * | 11/2003 | Miyazaki | 303/150 |

FOREIGN PATENT DOCUMENTS

| | | |
|---|---|---|
| DE | 3923599 | 2/1990 |
| DE | 10107455 | 1/2002 |
| DE | 103 04 769 A1 | 8/2003 |
| JP | 01-202566 A | 8/1989 |
| JP | 02-158449 | 6/1990 |
| JP | 04-005156 | 1/1992 |
| JP | 05-270388 A | 10/1993 |
| JP | 06-024320 | 2/1994 |
| JP | 2000-233737 A | 8/2000 |
| JP | 2001-133391 | 5/2001 |
| JP | 2001-287633 | 10/2001 |
| JP | 3382269 | 12/2002 |
| WO | WO 2005087563 A1 * | 9/2005 |

* cited by examiner

Primary Examiner — Robert A Siconolfi
Assistant Examiner — Anna Momper
(74) Attorney, Agent, or Firm — Carrier Blackman & Associates, P.C.; Joseph P. Carrier; William D. Blackman (57) ABSTRACT A vehicular anti-lock control system includes: a ground load calculation section for detecting or estimating a ground load of a wheel; a road surface friction coefficient calculation section for detecting or estimating a road surface friction coefficient; and a reference fluid pressure calculation section for calculating an upper side reference fluid pressure and a lower side reference fluid pressure in anti-lock control based on the ground load and the friction coefficient. The upper and lower side reference fluid pressures are respectively determined to be an upper limit value and a lower limit value of a fluid pressure in anti-lock control. Therefore, it is possible to suppress the amount of change in the fluid pressure during anti-lock control, thus improving the braking effect and the braking feel.

13 Claims, 10 Drawing Sheets

VEHICULAR ANTI-LOCK CONTROL SYSTEM

CROSS-REFERENCE TO RELATED APPLICATIONS

The present invention claims priority under 35 USC 119 based on Japanese patent application No. 2005-338728, filed on Nov. 24, 2005. The subject matter of this priority document is incorporated by reference herein.

BACKGROUND OF INVENTION

1. Field of Invention

The present invention relates to a vehicular anti-lock control system that includes anti-lock control means for suppressing locking of a wheel by controlling fluid pressure supplied to a wheel brake based on a reference fluid pressure when it is determined, based on a wheel speed detected by a wheel speed sensor, that the wheel has a tendency to lock.

2. Description of Related Art

Japanese Patent Publication No. 3382269 discloses a vehicular anti-lock control system wherein when a wheel is about to lock due to an excessive braking force of a fluid pressure type wheel brake, fluid pressure supplied to the wheel brake is reduced to suppress locking of the wheel. In this system, when starting anti-lock control, a reference fluid pressure as a reference for proportional-integral-derivative (PID) feedback control of the fluid pressure supplied to the wheel brake is obtained by correcting an actual fluid pressure when starting the anti-lock control with a wheel acceleration/deceleration. After the anti-lock control is started, the reference fluid pressure obtained when the control is started is corrected corresponding to the tendency of the wheel to lock and is used for the PID feedback control.

However, in this conventional system, the road surface friction coefficient is not taken into consideration when the reference fluid pressure for anti-lock control is changed. Therefore, even in the case, for example, where the amount of decrease of the fluid pressure could be made small since the road surface friction coefficient is sufficiently large, an excessive pressure decrease may be carried out, so that the braking distance might not be sufficiently reduced or the braking feel might be deteriorated.

SUMMARY OF THE INVENTION

The present invention has been accomplished in view of the above-mentioned circumstances, and it is an object thereof to appropriately set a reference fluid pressure for controlling fluid pressure supplied to a wheel brake during anti-lock control.

In order to achieve the above object, according to a first feature of the present invention, there is provided a vehicular anti-lock control system comprising a wheel speed sensor for detecting a wheel speed of a wheel and an anti-lock control device. When it is determined, based on the wheel speed detected by the wheel speed sensor, that the wheel has a tendency to lock, then the anti-lock control device suppresses locking of the wheel by controlling fluid pressure supplied to a wheel brake based on a reference fluid pressure. The anti-lock control device comprises: a ground load calculation section for detecting or estimating a ground load of the wheel; a road surface friction coefficient calculation section for detecting or estimating a road surface friction coefficient; and a reference fluid pressure calculation section for calculating the reference fluid pressure based on the ground load and the friction coefficient.

With the first feature, the anti-lock control device, which controls the fluid pressure supplied to the wheel brake based on the reference fluid pressure when it is determined that the wheel has a tendency to lock, calculates the reference fluid pressure based on the ground load of the wheel and the road surface friction coefficient. Therefore, it is possible to suppress the amount of change in the fluid pressure during anti-lock control, thus improving the braking effect and the braking feel.

According to a second feature of the present invention, in addition to the first feature, the reference fluid pressure is determined as a lower limit value of the fluid pressure in anti-lock control.

With the second feature, since the lower limit value of the fluid pressure in anti-lock control is restricted by the reference fluid pressure, it is possible to prevent the fluid pressure from excessively decreasing during anti-lock control, thus improving the braking efficiency.

According to a third feature of the present invention, in addition to the first feature, the reference fluid pressure is determined as an upper limit value of the fluid pressure in anti-lock control. When pressure increase control of the fluid pressure is being carried out during anti-lock control while the fluid pressure exceeds the upper limit value, an amount of increase in the fluid pressure is corrected so as to be smaller than in a case where the fluid pressure is equal to or less than the upper limit value.

With the third feature, since the reference fluid pressure is determined to be an upper limit value for the fluid pressure in anti-lock control, and if the fluid pressure exceeds the upper limit value during pressure increase control, the amount of increase in the fluid pressure is corrected to be smaller than in the case when the fluid pressure is equal to or less than the upper limit value. Therefore, it is possible to prevent the fluid pressure from excessively increasing during anti-lock control, thus improving the braking efficiency.

According to a fourth feature of the present invention, in addition to any one of the first to third features, the anti-lock control device further comprises: a vehicle body speed calculation section for calculating a vehicle body speed based on the wheel speed; a slip ratio calculation section for calculating a slip ratio of the wheel based on the wheel speed and the vehicle body speed; and a reference fluid pressure correction section for correcting the reference fluid pressure so that the reference fluid pressure decreases corresponding to an increase in the slip ratio.

With the fourth feature, the reference fluid pressure is corrected to decrease corresponding to an increase in the slip ratio of the wheel calculated by the anti-lock control device based on the wheel speed and the vehicle body speed. Therefore, it is possible to keep the fluid pressure low when the wheel has a strong tendency to lock, thus suppressing an increase in the slip ratio of the wheel.

A lower limit value of the second feature corresponds to a lower limit reference fluid pressure of embodiments, and an upper limit value of the third feature corresponds to an upper limit reference fluid pressure of the embodiments.

The above-mentioned object, other objects, characteristics, and advantages of the present invention will become apparent from preferred embodiments that will be described in detail below by reference to the attached drawings.

BRIEF DESCRIPTION OF THE DRAWINGS

FIG. 1 to FIG. 8 show a first embodiment of the present invention;

FIG. 9 and FIG. 10 show a second embodiment of the present invention;

DESCRIPTION OF PREFERRED EMBODIMENTS

Figure 1:
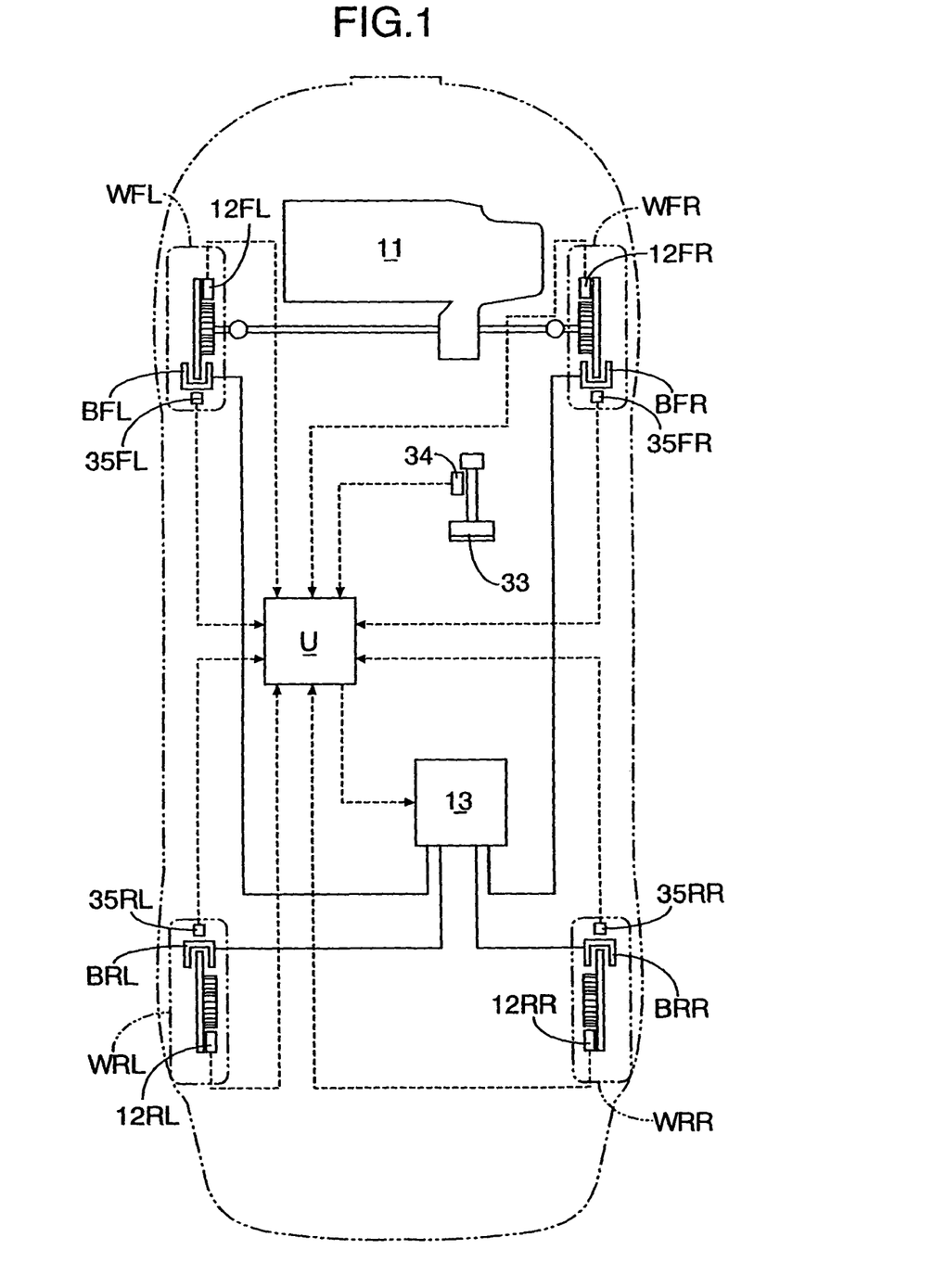
FIG. 1 is a diagram showing a vehicular braking system.

As shown in FIG. 1, power from a power unit 11 comprising an engine and a transmission is transmitted to front left and right wheels WFL and WFR which are driven wheels. The front wheels WFL and WFR are equipped respectively with wheel brakes BFL and BFR and wheel speed sensors 12FL and 12FR. Further, rear left and right wheels WRL and WRR, which are follower wheels, are equipped respectively with wheel brakes BRL and BRR and wheel speed sensors 12RL and 12RR. Each of the wheel brakes BFL, BFR, BRL and BRR receives a brake fluid pressure from a brake fluid pressure circuit 13.

Figure 2:
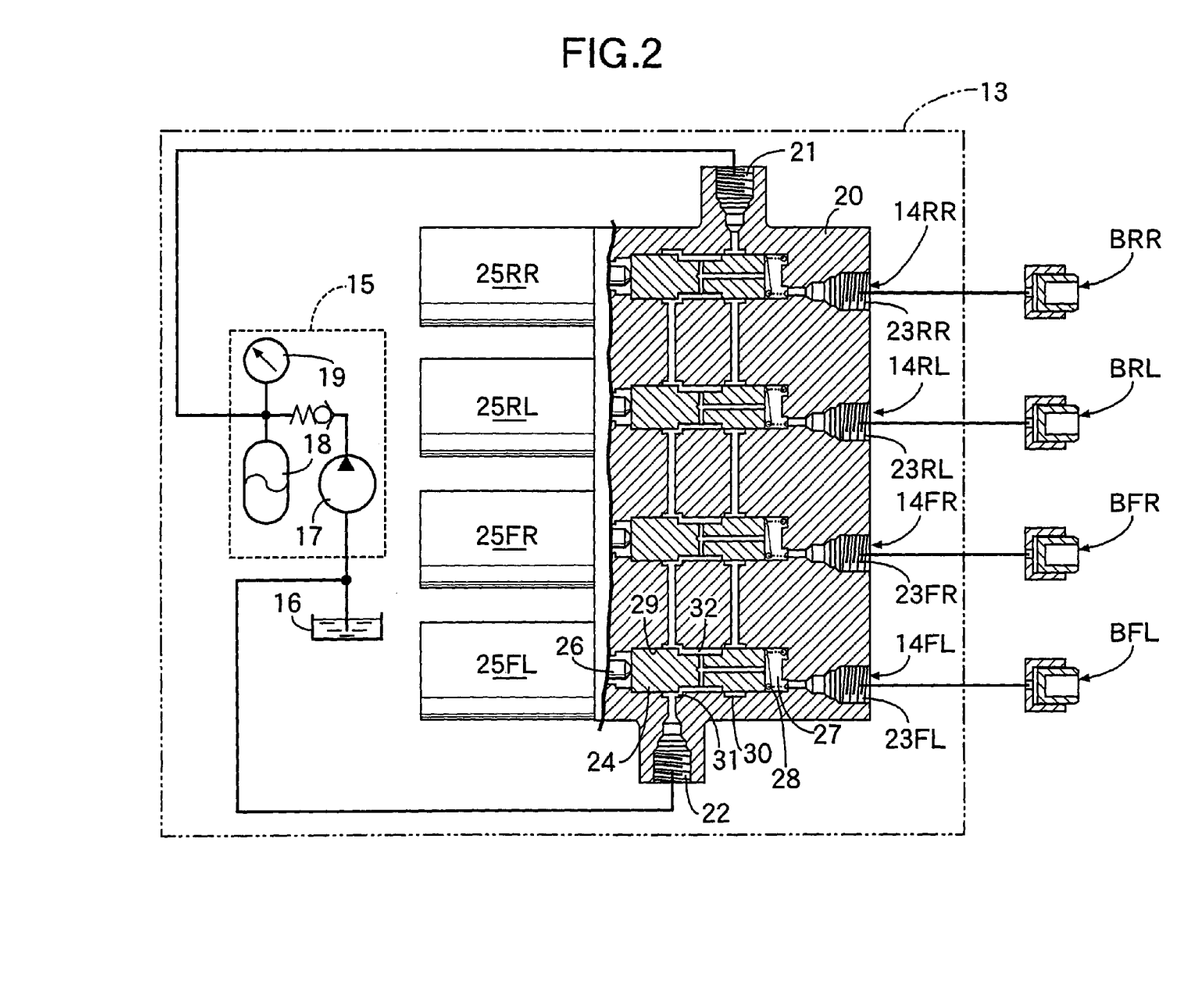
FIG. 2 is a diagram showing the arrangement of a brake fluid pressure circuit.

As shown in FIG. 2, the brake fluid pressure circuit 13 includes: a modulator 14FL which is an actuator capable of adjusting the braking force of the front left wheel brake BFL; a modulator 14FR which is an actuator capable of adjusting the braking force of the front right wheel brake BFR; a modulator 14RL which is an actuator capable of adjusting the braking force of the rear left wheel brake BRL; a modulator 14RR which is an actuator capable of adjusting the braking force of the rear right wheel brake BRR; and a common fluid pressure source 15 for the modulators 14FL, 14FR, 14RL and 14RR.

The fluid pressure source 15 includes: a fluid pressure pump 17 which draws up hydraulic oil from a hydraulic fluid tank 16; an accumulator 18 which is connected to the fluid pressure pump 17; and a pressure switch 19 for controlling the operation of the fluid pressure pump 17.

The modulators 14FL, 14FR, 14RL and 14RR are arranged in a common housing 20 so as to be parallel to each other. Since each of the modulators 14FL, 14FR, 14RL and 14RR has basically the same arrangement, only the modulator 14FL will be described in detail below thus omitting detailed description of the other modulators 14FR, 14RL and 14RR.

The housing 20 comprises: an input port 21 connected to the fluid pressure source 15; a release port 22 communicating with the hydraulic fluid tank 16; and four output ports 23FL, 23FR, 23RL and 23RR individually connected to the respective wheel brakes BFL, BFR, BRL and BRR.

The modulator 14FL includes a spool 24 slidably fitted into the housing 20, and a linear solenoid 25FL mounted on the housing 20 so as to push the spool 24 in the axial direction. The linear solenoid 25FL has a drive rod 26 coaxially abutting against one end of the spool 24. An output chamber 27 is formed within the housing 20, and the other end of the spool 24 faces the output chamber 27. Further, the output chamber 27 communicates with the output port 23FL, and a return spring 28 is housed within the output chamber 27, the return spring 28 urging the spool 24 toward the linear solenoid 25FL. Therefore, the spool 24 always abuts against the drive rod 26 due to the spring force of the return spring 28, so that the spool 24 and the linear solenoid 25FL are operatively connected. As shown in FIG. 2, the spool 24 has a first fluid passage formed therethrough and extending in a direction transverse to the longitudinal axis of the spool. The spool 24 also has a second fluid passage formed therein extending in an axial direction. The second fluid passage communicates with the first fluid passage, and extends from the first fluid passage to an end surface of the spool proximate the output chamber 27.

The housing 20 is provided with a cylinder hole 29 slidably supporting the spool 24. The cylinder hole 29 has, on its inner surface, an annular brake application groove 30 communicating with the input port 21, and an annular fluid return groove 31 communicating with the release port 22, the grooves 30 and 31 being provided at axially spaced-apart positions. Further, the spool 24 has, on its outer surface, an annular recess 32 formed thereon that always communicates with the output chamber 27 via the first and second fluid passages of the spool. The spool 24 switches over between a brake application state and a resting state, depending on the position of the drive rod 26. In the brake application state, the drive rod is extended, the spool is moved to the right in FIG. 2 to compress the spring 28, and the annular recess 32 communicates with the annular brake application groove 30 to thus provide fluid communication via the internal fluid passages of the spool between the input port 21 and the output chamber 27, that is, the output port 23FL. In the resting state of the spool, the annular recess 32 communicates with the annular fluid return groove 31 to thus provide communication between the output chamber 27 and the release port 22. The applied state of the spool 24 is determined in correspondence to its axial position resulting from change in the relationship in magnitude between the thrust of the linear solenoid 25FL acting on one end in the axial direction and the fluid pressure of the output chamber 27 acting on the other end in the axial direction.

The linear solenoid 25FL generates a thrust in response to the amount of electrical power applied thereto. The fluid pressure of the output chamber 27, that is, the fluid pressure given from the output port 23FL to the front left wheel brake BFL, can be freely controlled by controlling the amount of electrical power applied to the linear solenoid 25FL.

Also the other modulators 14FR, 14RL and 14RR are capable of controlling the fluid pressure acting on the wheel brakes BFR, BRL and BRR, by controlling the amount of electrical power applied to the linear solenoids 25FR, 25RL and 25RR as in the case of the modulator 14FL.

Returning to FIG. 1, connected to an electronic control unit U for carrying out anti-lock control are a depressing force sensor 34 for detecting a depressing force on a brake pedal 33, wheel speed sensors 12FL, 12FR, 12RL and 12RR, and fluid pressure sensors 35FL, 35FR, 35RL and 35RR for detecting fluid pressure acting on the wheel brakes BFL, BFR, BRL and BRR.

At the time of normal control in which none of the wheels WFL, WFR, WRL and WRR have a tendency to lock, the electronic control unit U controls the amount of electrical power applied to the linear solenoids 25FL, 25FR, 25RL and 25RR of the modulators 14FL, 14FR, 14RL and 14RR of the brake fluid pressure circuit 13, based on a depressing force on the brake pedal 33 detected by the depressing force sensor 34, thereby generating a braking force corresponding to the depressing force in the wheel brakes BFL, BFR, BRL and BRR.

On the other hand, at the time of anti-lock control in which any of the wheels WFL, WFR, WRL and WRR has a tendency to lock, the electronic control unit U controls the amount of electrical power applied to the linear solenoid 25FL, 25FR, 25RL or 25RR of the modulator 14FL, 14FR, 14RL or 14RR, based on values detected by the wheel speed sensor 12FL, 12FR, 12RL or 12RR and the fluid pressure sensors 35FL, 35FR, 35RL or 35RR.

The arrangement of the electronic control unit U is now described.

Figure 3:
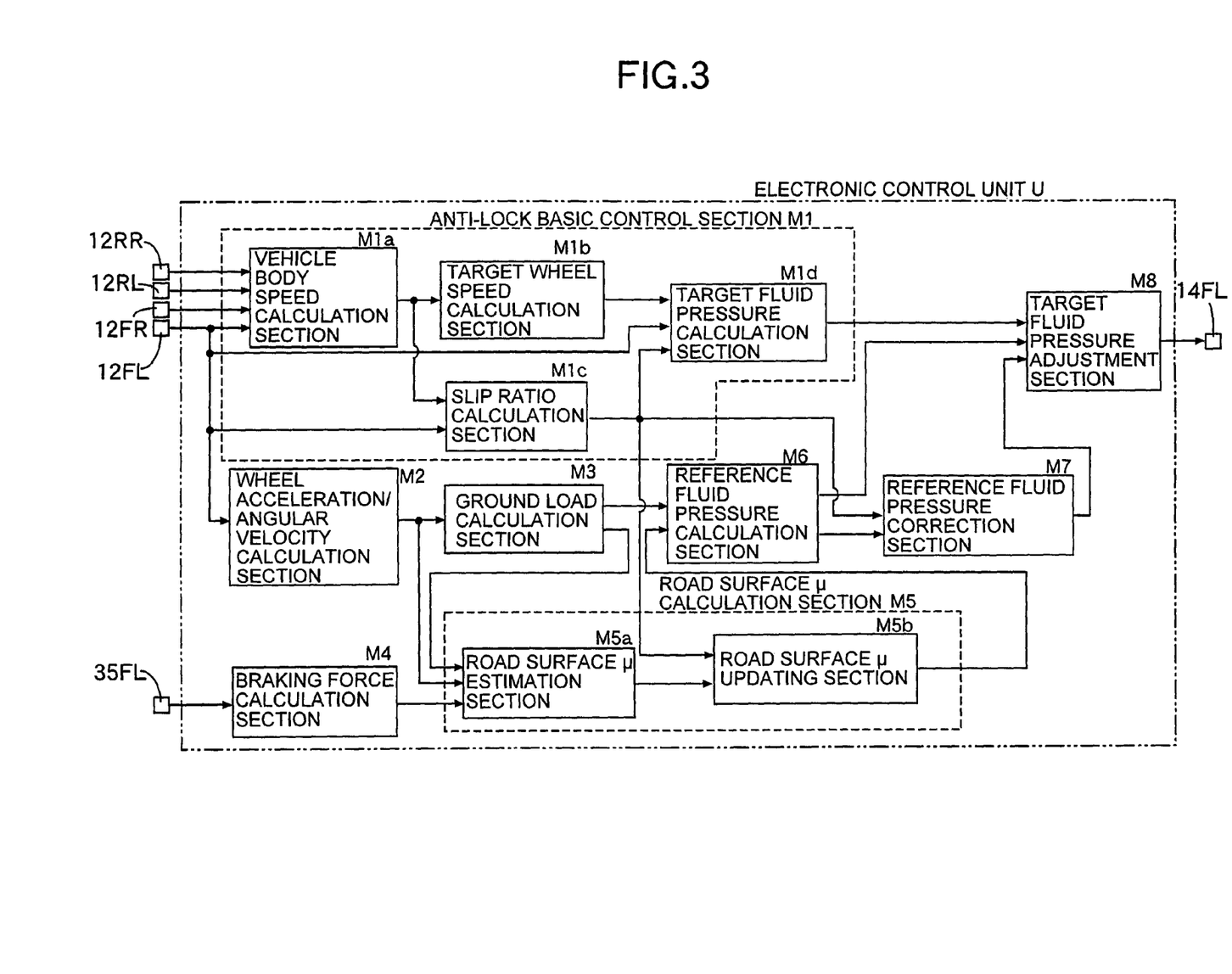
FIG. 3 is a block diagram showing the arrangement of an electronic control unit.

As shown in FIG. 3, the electronic control unit U for carrying out anti-lock control includes: a vehicle body speed calculation section M1$a$; a target wheel speed calculation section M1$b$; a slip ratio calculation section M1$c$; a target fluid pressure calculation section M1$d$; a wheel acceleration/angular velocity calculation section M2; a ground load calculation section M3; a braking force calculation section M4; a road surface friction coefficient estimation section M5$a$; a road surface friction coefficient updating section M5$b$; a reference fluid pressure calculation section M6; a reference fluid pressure correction section M7; and a target fluid pressure adjustment section M8. The vehicle body speed calculation section M1$a$, the target wheel speed calculation section M1$b$, the slip ratio calculation section M1$c$, and the target fluid pressure calculation section M1$d$ together form an anti-lock basic control section M1. The road surface friction coefficient estimation section M5$a$ and the road surface friction coefficient updating section M5$b$ together form a road surface friction coefficient calculation section MS.

Anti-lock control is carried out in the same way for each of the four wheels WFL, WFR, WRL and WRR. FIG. 3 illustrates an anti-lock control system for the front left wheel WFL as their representative.

The vehicle body speed calculation section M1$a$ calculates a vehicle body speed based on, for example, the average value of outputs from the wheel speed sensors 12FL, 12FR, 12RL and 12RR of the four wheels WFL, WFR, WRL and WRR.

The target wheel speed calculation section M1$b$ calculates a target wheel speed which is a target value for the wheel speed during anti-lock control, while taking into consideration a predetermined slip ratio in addition to the vehicle body speed calculated by the vehicle body speed calculation section M1$a$.

The slip ratio calculation section M1$c$ calculates a slip ratio of the front left wheel WFL with the vehicle body speed calculated by the vehicle body speed calculation section M1$a$ and a wheel speed of the front left wheel WFL detected by the wheel speed sensor 12FL.

The target fluid pressure calculation section M1$d$ calculates a target fluid pressure corresponding to a deviation of the wheel speed of the front left wheel WFL detected by the wheel speed sensor 12FL with the target wheel speed calculated by the target wheel speed calculation section M1$b$, when it is determined that the slip ratio of the front left wheel WFL calculated by the slip ratio calculation section M1$c$ exceeds a predetermined threshold value and the front left wheel WFL has a tendency to lock.

The wheel acceleration/angular velocity calculation section M2 calculates a wheel acceleration of the front left wheel WFL as a differential value of the output of the wheel speed sensor 12FL for the front left wheel WFL, and also calculates a wheel angular velocity ω by dividing the wheel speed by a wheel radius.

The ground load calculation section M3 calculates a ground load W of the front left wheel WFL from a wheel acceleration G calculated by the wheel acceleration/angular velocity calculation section M2, using the following equation:

$$W = Wfl + G*(HG/LWB*WT*1/2)$$

where

Wfl: static load of front left wheel
HG: height of center of gravity
LWB: wheel base
WT: weight of vehicle
WF: sum of static loads of front left and right wheels In the equation above for the ground load W, it is also possible to use, instead of the wheel acceleration G, a value detected by an acceleration sensor mounted on the vehicle body, the acceleration sensor detecting an acceleration in the front/rear direction of the vehicle. Further, it is also possible to use, as an alternative to the wheel acceleration G and the acceleration in the front/rear direction of the vehicle, a road surface friction coefficient estimated and updated by the road surface friction coefficient estimation section M5$a$ and the road surface friction coefficient updating section M5$b$ which will be described later.

The braking force calculation section M4 calculates a braking force for the front left wheel WFL, based on the fluid pressure on the wheel brake BFL detected by the fluid pressure sensor 35FL of the front left wheel WFL.

The road surface friction coefficient estimation section M5$a$ calculates a road surface friction coefficient μ with a braking force FB calculated by the braking force calculation section M4, the ground load W and the wheel angular velocity ω, using the following equation:

$$\mu = \{FB + (I*d\omega/dt)/r\}/W$$

where
I: moment of inertia of wheel
r: radius of wheel

Estimation of the road surface friction coefficient is carried out while the brake is operating, and when the brake is not operating, μ=1.

Figure 8:
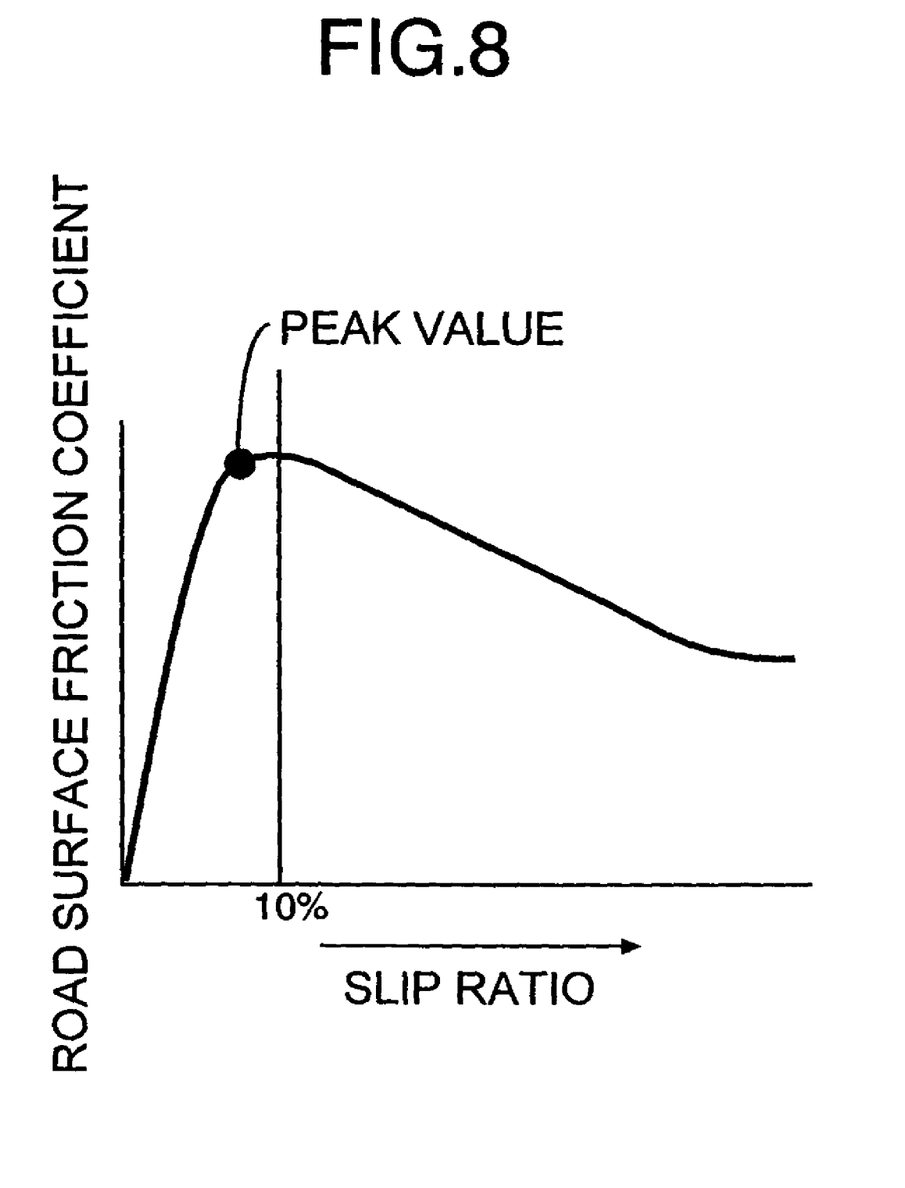
FIG. 8 is a graph showing the relationship between slip ratio and road surface friction coefficient.

The road surface friction coefficient updating section M5$b$ updates the road surface friction coefficient estimated by the road surface friction coefficient estimation section M5$a$, when the slip ratio λ of the front left wheel WFL calculated by the slip ratio calculation section M1$c$ is increasing and is within a predetermined range (e.g. 0% to 10%) (see FIG. 8).

Figure 4:
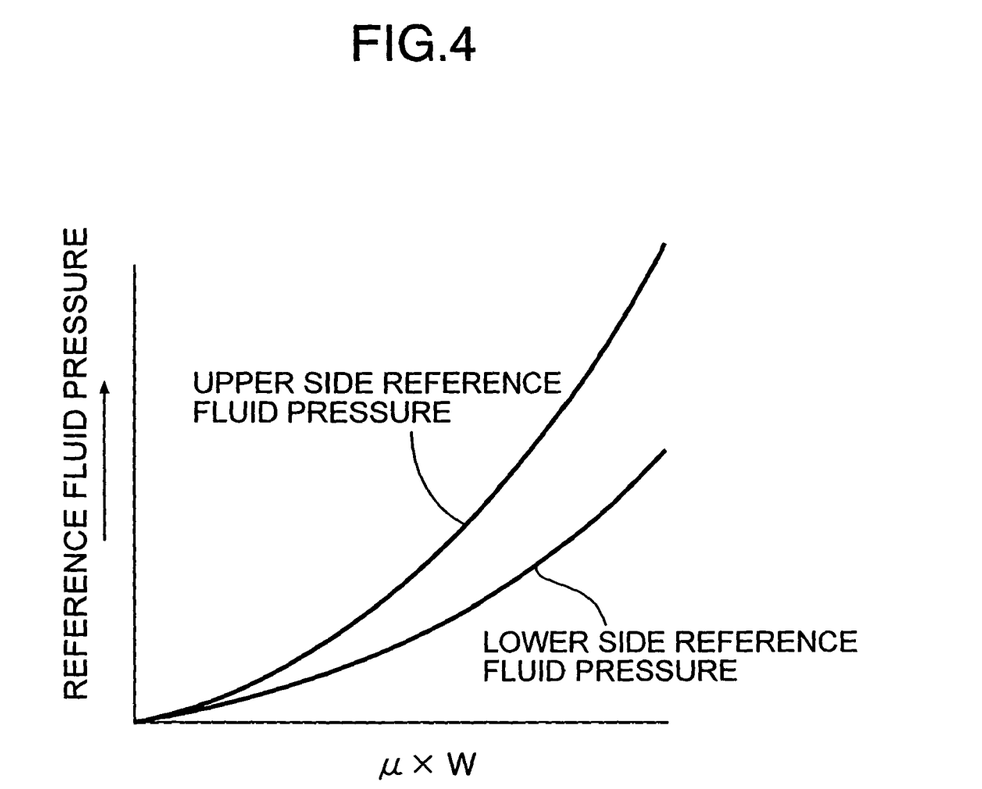
FIG. 4 is a diagram showing a map from which a reference fluid pressure data pair is looked up with a road surface friction coefficient and a ground load, the data pair including a low side value and a high side value.

The reference fluid pressure calculation section M6 determines, by map-search, a reference fluid pressure used for anti-lock control, based on the ground load W of the front left wheel WFL calculated by the ground load calculation section M3 and the road surface friction coefficient μ updated by the road surface friction coefficient updating section M5$b$. That is, a lower side reference fluid pressure and an upper side reference fluid pressure are calculated by applying μ*W (corresponding to a frictional force that can act between the front left wheel WFL and the road surface) to the map of FIG. 4.

Figure 5:
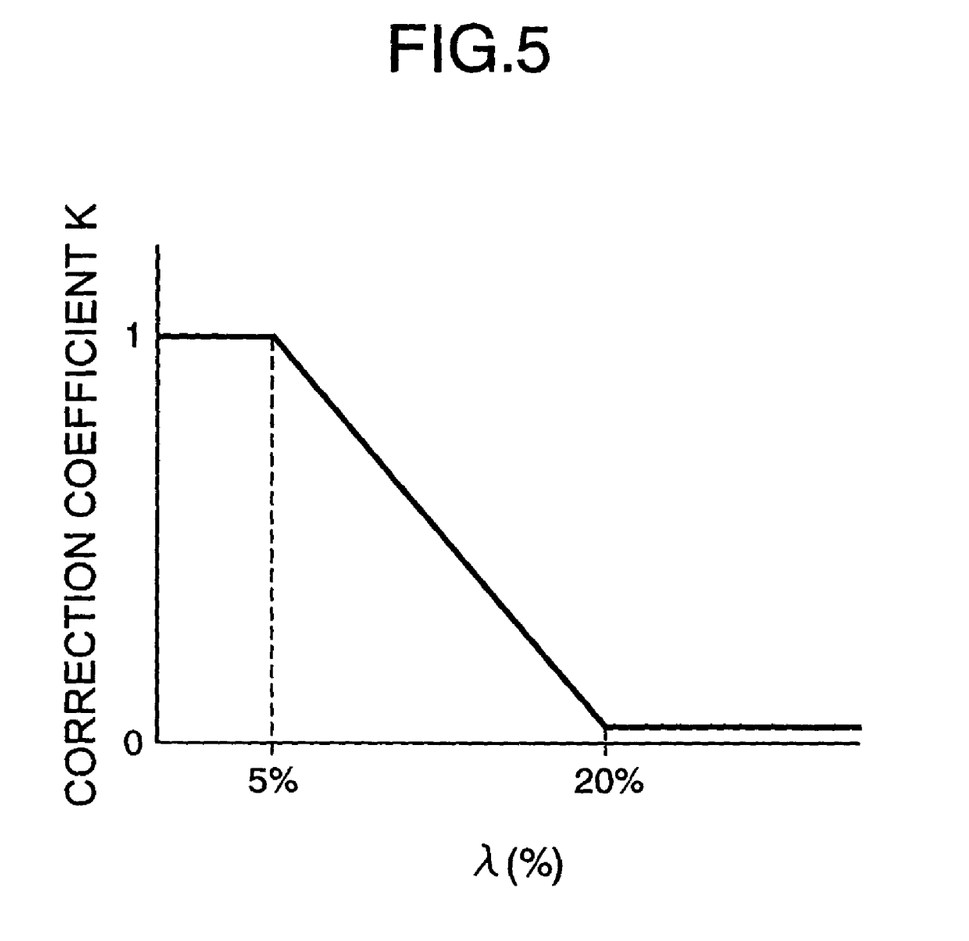
FIG. 5 is a diagram showing a map from which a correction coefficient for correcting a lower side reference fluid pressure is looked up with a slip ratio.

The reference fluid pressure correction section M7 corrects the lower side reference fluid pressure calculated by the reference fluid pressure calculation section M6, using a slip ratio λ calculated by the slip ratio calculation section M1$c$. Specifically, a correction coefficient K is looked up from the map of FIG. 5 by applying the slip ratio λ to the map of FIG. 5, and the reference fluid pressure is corrected by multiplying it by the correction coefficient K. For example, the correction coefficient K is set at 1 in a range where the slip ratio λ is 5% or less; is set at a small value close to 0 in a range where the slip ratio λ is 20% or more; and the correction coefficient K decreases linearly from 1 to the small value close to 0 in a range where the slip ratio λ is over 5% and below 20%. Therefore, in a range where the slip ratio λ is small, the lower side reference fluid pressure is outputted as it is or uncorrected, and the lower side reference fluid pressure decreases as the slip ratio λ increases.

Figure 6:
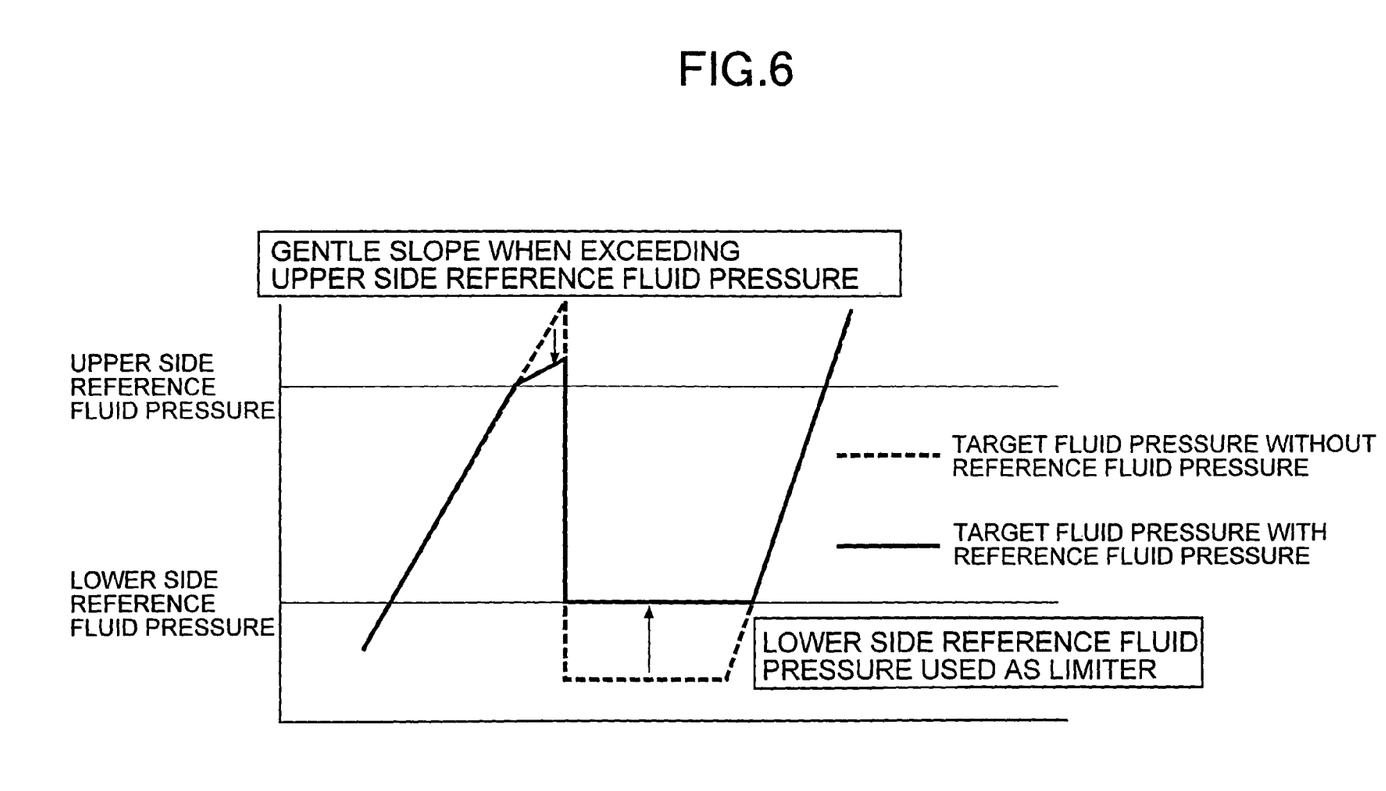
FIG. 6 is a diagram for explaining the functions of the lower side reference fluid pressure and an upper side reference fluid pressure.

The target fluid pressure adjustment section M8 compares the target fluid pressure calculated by the target fluid pressure calculation section M1d with the upper side reference fluid pressure calculated by the reference fluid pressure calculation section M6. As shown in FIG. 6, the brake fluid pressure is controlled so as to decrease when the wheel speed is lower than the target wheel speed on the pressure decrease side, and is controlled so as to increase when the wheel speed exceeds the target wheel speed on the pressure increase side (>target wheel speed on the pressure decrease side), so that the brake fluid pressure periodically increases and decreases. When the target fluid pressure becomes less than the lower side reference fluid pressure during the pressure decreasing process, the target fluid pressure is limit-processed so as to coincide with the lower side reference fluid pressure. That is, control is carried out as follows:

target fluid pressure←lower side reference fluid pressure.

Further, when the target fluid pressure exceeds the upper side reference fluid pressure during the pressure increasing process, the increase in the target fluid pressure is adjusted to be gentle.

That is, when target fluid pressure>upper side reference fluid pressure, and the target fluid pressure is increasing, control is carried out as follows:

target fluid pressure←(target fluid pressure−upper side reference fluid pressure)*k+upper side reference fluid pressure, wherein 0<k<1, and when target fluid pressure>upper side reference fluid pressure and the target fluid pressure is decreasing, control is carried out as follows:

target fluid pressure←target fluid pressure.

As described above, the operation of the modulator 14FL of the brake fluid pressure circuit 13 is controlled based on the target fluid pressure outputted by the target fluid pressure adjustment section M8.

Figure 7:
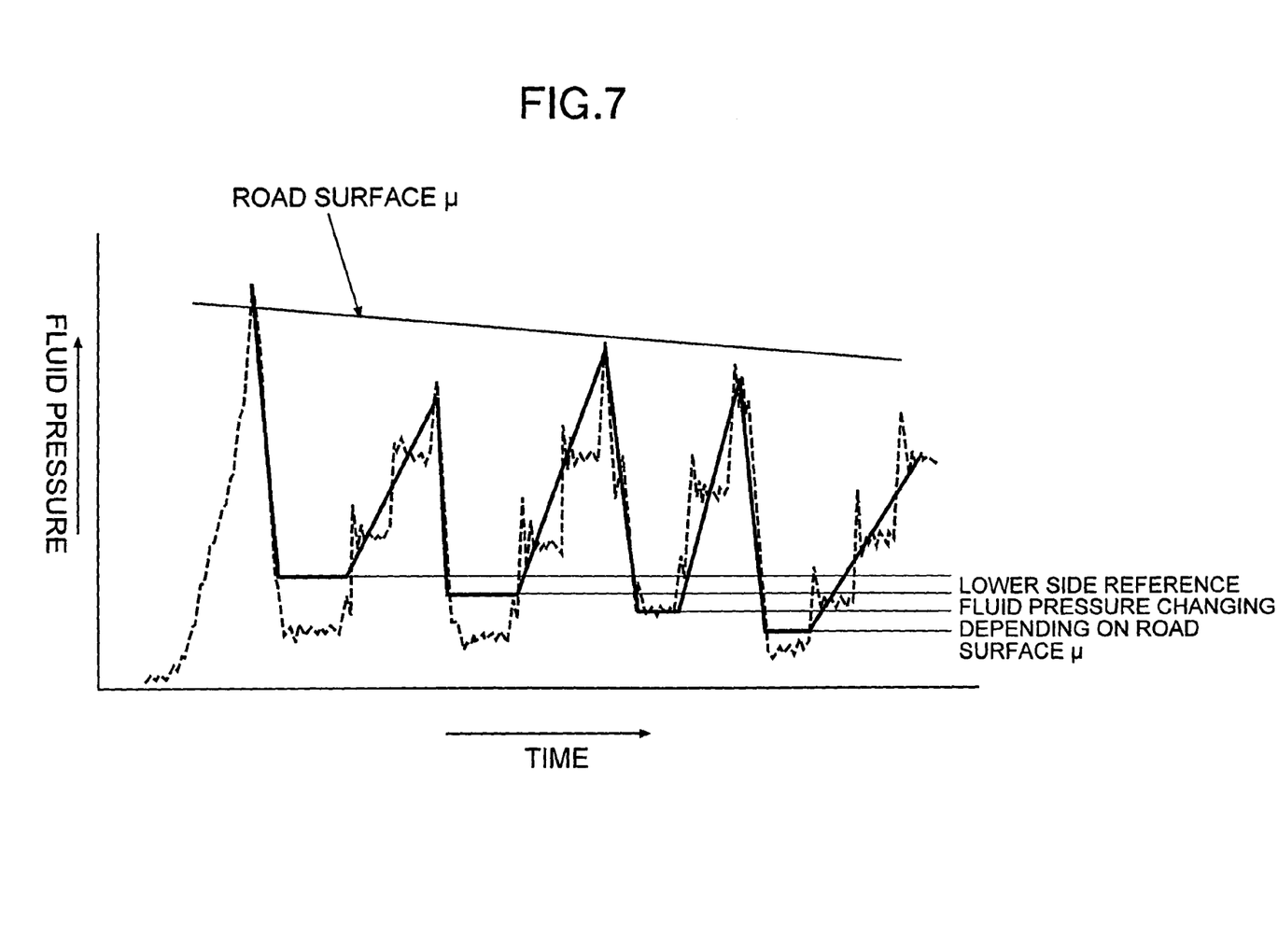
FIG. 7 is a graph showing changes in target fluid pressure during anti-lock control.

FIG. 7 shows changes in the target fluid pressure during anti-lock control on a road surface where the road surface friction coefficient gradually decreases. In FIG. 7, the solid line shows control in accordance with the first embodiment using a lower side reference fluid pressure, and the broken line shows control in accordance with a conventional arrangement without using the lower side reference fluid pressure. It can be understood from this diagram that, in the first embodiment, the lower side reference fluid pressure decreases as the road surface friction coefficient decreases. In the case of FIG. 7, the target fluid pressure is not restricted by an upper side reference fluid pressure.

As described above, in accordance with the first embodiment, the lower side reference fluid pressure and the upper side reference fluid pressure are calculated as a reference fluid pressure in anti-lock control, based on the product of the ground load of the wheel and the road surface friction coefficient, that is, the frictional force actually acting between the wheel and the road surface. The lower side reference fluid pressure and the upper side reference fluid pressure are used to suppress an excessive decrease in the target fluid pressure at the time of decreasing the pressure and an excessive increase in the target fluid pressure at the time of increasing the pressure. Therefore, it is possible to improve the braking efficiency, thus further reducing the braking distance and improving the braking feel.

Further, in accordance with the first embodiment, anti-lock control can be carried out with a good precision by using the lower side reference fluid pressure and the upper side reference fluid pressure, thereby stabilizing the slip ratio of the wheel within a narrow range. Furthermore, the road surface friction coefficient updating section M5b updates the road surface friction coefficient based on this stabilized slip ratio, when the slip ratio is increasing in a predetermined range (e.g. in a range of 0% to 10%) that includes the peak road surface friction coefficient in the graph of FIG. 8 showing the relationship between the slip ratio and the road surface friction coefficient, thereby calculating the peak value of the road surface friction coefficient with a good precision.

Figure 9:
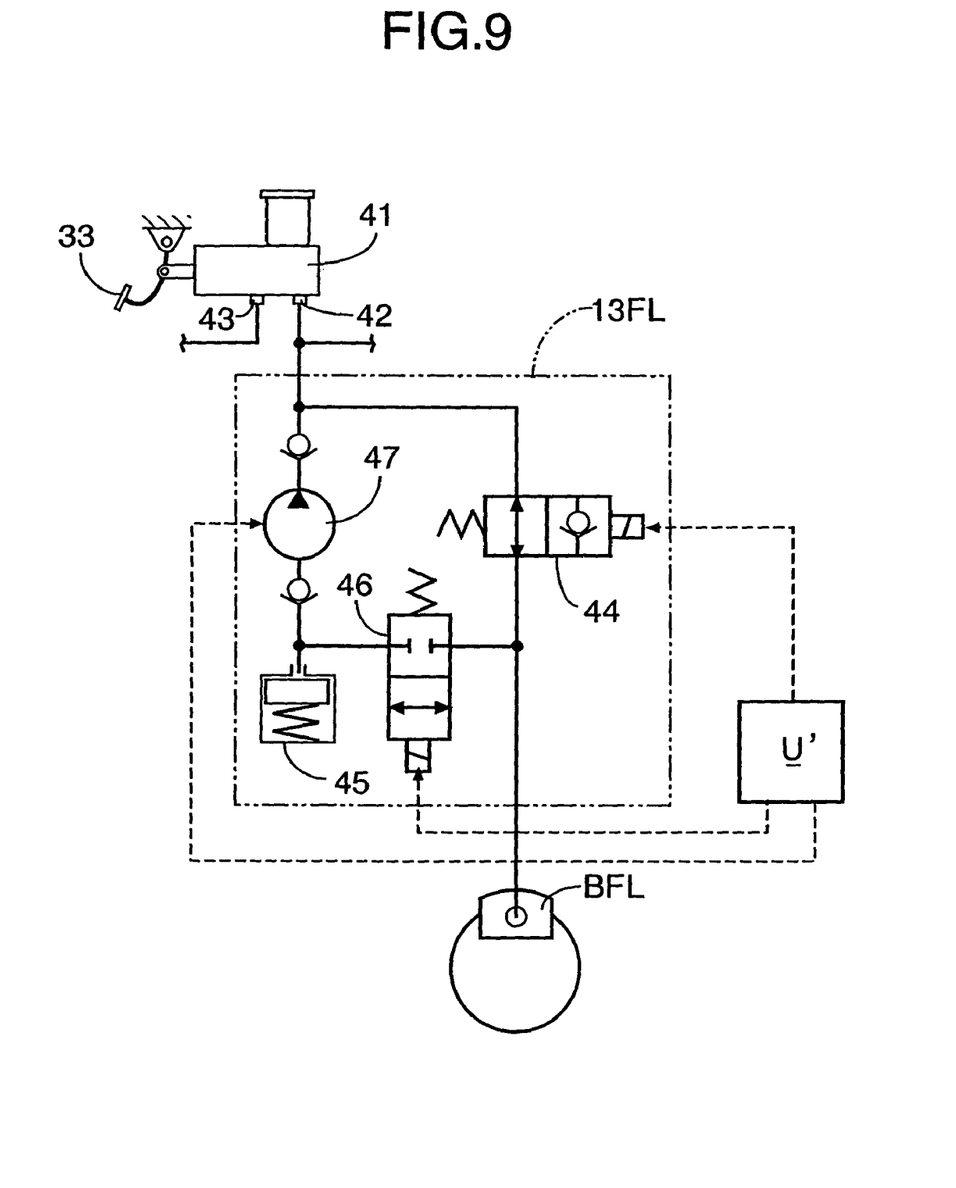
FIG. 9 is a diagram showing the arrangement of a brake fluid pressure circuit of a front left wheel.
Figure 10:
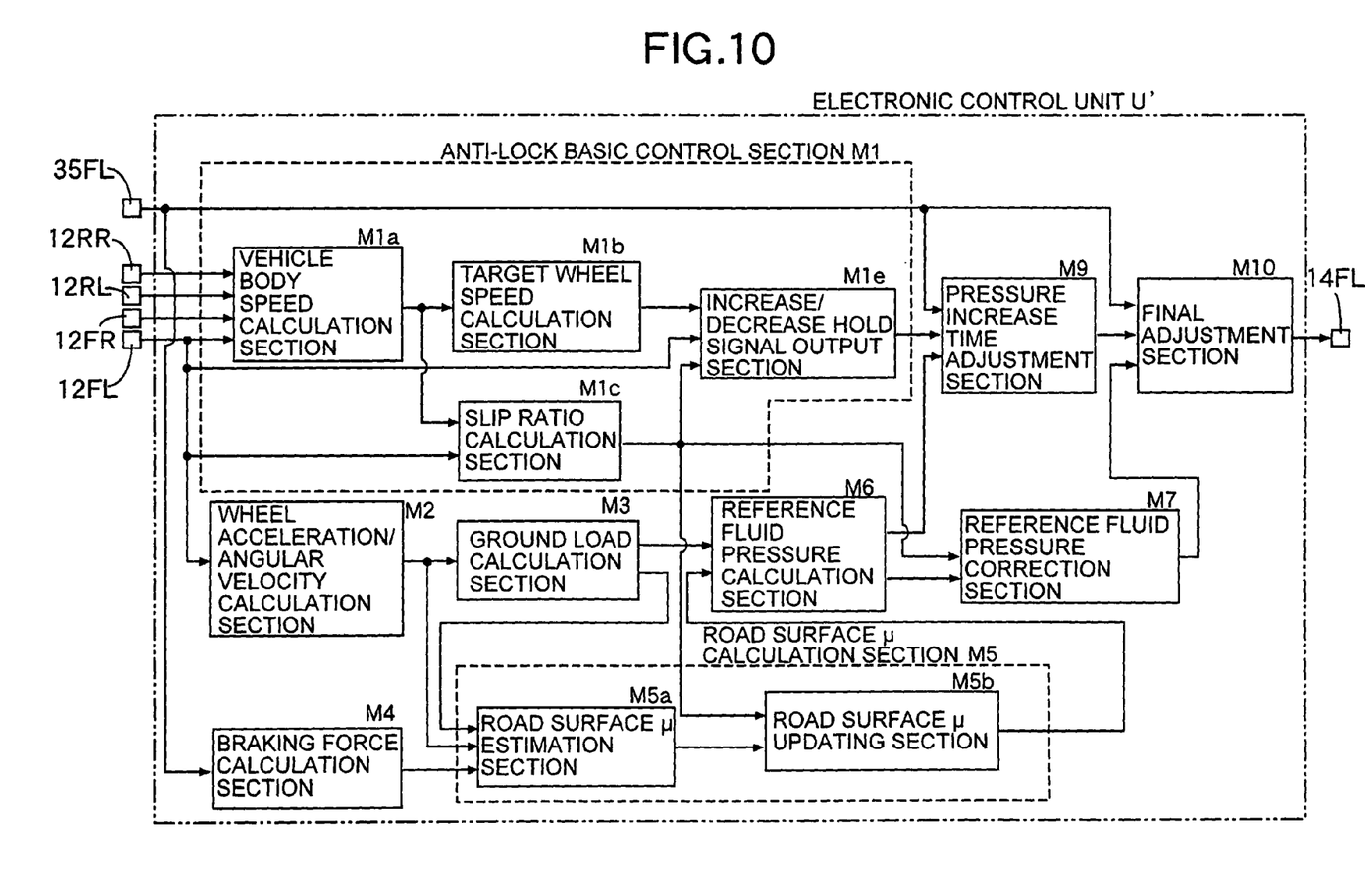
FIG. 10 is a block diagram showing the arrangement of an electronic control unit.

FIG. 9 and FIG. 10 show a second embodiment of the present invention; FIG. 9 is a diagram showing the arrangement of a brake fluid pressure circuit of a front left wheel, and FIG. 10 is a block diagram showing the arrangement of an electronic control unit.

As shown in FIG. 9, a tandem-type master cylinder 41 operated by a brake pedal 33 includes a first output port 42 and a second output port 43 each of which outputs a fluid pressure independently from each other corresponding to a depressing operation of the brake pedal 33. The first output port 42 is connected to a wheel brake BFL of a front left wheel WFL via a brake fluid pressure circuit 13FL, and is also connected to a wheel brake BRR of a rear right wheel WRR via a brake fluid pressure circuit 13RR. Further, the second output port 43 is connected to a wheel brake BFR of a front right wheel WFR via a brake fluid pressure circuit 13FR, and is also connected to a wheel brake BRL of a rear left wheel WRL via a brake fluid pressure circuit 13RL. Since the brake fluid pressure circuits 13FL, 13FR, 13RL and 13RR have substantially the same structure, FIG. 9 shows the brake fluid pressure circuit 13FL of the front left wheel WFL as their representative.

The brake fluid pressure circuit 13FL includes: a normally open solenoid valve 44 provided between the first output port 42 of the master cylinder 41 and the wheel brake BFL; a reservoir 45; a normally closed solenoid valve 46 provided between the wheel brake BFL and the reservoir 45; and a return pump 47 having an intake port connected to the reservoir 45 and a discharge port connected to a position between the first output port 42 and the normally open solenoid valve 44.

The normally open solenoid valve 44 is capable of switching over between a de-energized state in which communication is provided between the first output port 42 and the wheel brake BFL, and an energized state in which the action of fluid pressure from the first output port 42 to the wheel brake BFL is prevented but the flow of hydraulic fluid from the wheel brake BFL to the first output port 42 is permitted. The normally closed solenoid valve 46 is capable of switching over between a de-energized state in which communication between the wheel brake BFL and the reservoir 45 is cut off, and an energized state in which communication is provided between the wheel brake BFL and the reservoir 45.

An electronic control unit U' shown in FIG. 10 controls operation of the normally open solenoid valve 44, the normally closed solenoid valve 46, and the return pump 47 in the brake fluid pressure circuit 13FL. As is clear from comparison between FIG. 10 and FIG. 3 (the first embodiment), the second embodiment comprises an increase/decrease hold signal output section M1e instead of the target fluid pressure calculation section M1d of the first embodiment. Further, the second embodiment includes a pressure increase time adjustment section M9 into which are inputted an increase/decrease hold signal from the increase/decrease hold signal output section M1e, a fluid pressure from a fluid pressure sensor 35FL of the front left wheel WFL, and an upper side reference fluid pressure of a reference fluid pressure calculation section M6. Furthermore, the second embodiment comprises a final adjustment section M10 into which are inputted the fluid pressure from the fluid pressure sensor 35FL of the front left wheel WFL, an increase/decrease hold signal adjusted by the pressure increase time adjustment section M9, and a reference fluid pressure corrected by a reference fluid pressure correction section M7. The other components of the second embodiment are the same as those of the first embodiment.

In a control suspension mode where no anti-lock control is carried out, opening the normally open solenoid valve 44 and closing the normally closed solenoid valve 46 transmits the brake pressure, as it is or unchanged, from the master cylinder 41 to the wheel brake BFL.

On the other hand, in a pressure decrease mode of the anti-lock control, opening the normally closed solenoid valve 46 decreases the brake pressure of the wheel brake BFL; in a hold mode, closing the normally open solenoid valve 44 maintains the hydraulic fluid pressure of the wheel brake BFL; and in a pressure increase mode, repeatedly opening and closing the normally open solenoid valve 44 with a short cycle to gradually transmit the hydraulic fluid pressure from the master cylinder 41 to the wheel brake BFL increases the brake pressure of the wheel brake BFL. Repeatedly carrying out the pressure decrease mode, the hold mode and the pressure increase mode reduces the braking distance while suppressing locking of the wheel WFL.

The operation of the electronic control unit U' is now described focusing on difference from the first embodiment. When the increase/decrease hold signal output section M1e of an anti-lock basic control section M1 determines that the front left wheel WFL has a tendency to lock considering that the slip ratio of the front left wheel WFL calculated by the slip ratio calculation section M1c exceeds a predetermined threshold value, it calculates a pressure increase signal, a pressure decrease signal, or a hold signal (increase/decrease hold signal) corresponding to a deviation of an actual wheel speed from a target wheel speed calculated by a target wheel speed calculation section M1b. When the actual fluid pressure detected by the fluid pressure sensor 35FL is higher than an upper side reference fluid pressure, the pressure increase time adjustment section M9 corrects a pressure increase time, for which the normally open solenoid valve 44 is opened, so that the pressure increase time decreases, using a correction coefficient k (0<k<1) as follows:

pressure increase time←pressure increase time*k.

The correction coefficient k is looked up from a map using the actual fluid pressure and the upper side reference fluid pressure as parameters. In this control, when the actual fluid pressure exceeds the upper side reference fluid pressure, the pressure increase time is corrected downward and the increase in the actual fluid pressure is suppressed to be gentle.

The final adjustment section M10 feedback-controls the opening and closing of the normally open solenoid valve 44 and the normally closed solenoid valve 46 so that the actual fluid pressure coincides with the lower side reference fluid pressure, when the increase/decrease hold signal indicates a pressure decrease (or hold), the actual fluid pressure has a decreasing trend, and the actual fluid pressure is less than the lower side reference fluid pressure.

Also in accordance with the second embodiment, the same operational effects as those of the first embodiment can be achieved.

Although embodiments of the present invention have been described above, various modifications in design may be made to the present invention without departing from the subject matter thereof.

For example, controls using the lower side reference fluid pressure and the upper side reference fluid pressure are described in the embodiments, but the control using the upper side reference fluid pressure may be omitted.

Further, in the above descriptions, the present invention is applied to all the anti-lock control systems for the four wheels, but is applicable to some of the anti-lock control systems for some of the wheels (e.g. front left and right wheels) if necessary.

What is claimed is:

1. A vehicular brake anti-lock control system comprising:
    a wheel speed sensor which detects a wheel speed of a wheel; and
    an anti-lock control device which is operable to suppress locking of the wheel by controlling a target brake fluid pressure supplied to a wheel brake based on a reference fluid pressure data pair of upper and lower values of reference fluid pressures, when it is determined based on the wheel speed detected by the wheel speed sensor that the wheel has a tendency to lock, the reference fluid pressure data pair is selected from a first stored map;
    wherein the antilock control device includes a target fluid pressure calculation section that calculates a target fluid pressure based on the detected wheel speed;
    wherein the target brake fluid pressure is controlled to periodically increase and decrease based on detected wheel speed, wherein when the target brake fluid pressure becomes less than the lower value of the reference fluid pressure data pair the target brake fluid pressure is adjusted to coincide with the lower value of the reference fluid pressure data pair, and wherein when the target brake fluid pressure becomes greater than the upper value of the reference fluid pressure data pair, the target brake fluid pressure is adjusted to a value which lies between a pressure corresponding to an uncorrected target brake fluid pressure and a pressure corresponding to the upper value of the reference fluid pressure data pair and a rate of increase of the target brake fluid pressure is corrected so as to be smaller than in a case where the target brake fluid pressure is equal to or less than the upper value;
    and wherein the anti-lock control device comprises:
        a ground load calculation section which provides at least one of detection and estimation of a ground load of the wheel;
        a road surface friction coefficient calculation section which provides at least one of detection and estimation of a road surface friction coefficient; and
        a reference fluid pressure calculation section which calculates the reference fluid pressure data pair based on the ground load and the friction coefficient by using a predetermined map.

2. The vehicular anti-lock control system according to claim 1, wherein the lower value of the reference fluid pressure data pair is determined as a lower limit value of the target brake fluid pressure in anti-lock control.

3. The vehicular anti-lock control system according to claim 2, wherein the reference fluid pressure data pair decreases as the road surface friction coefficient decreases.

4. The vehicular anti-lock control system according to claim 1, wherein the anti-lock control device further comprises:
a vehicle body speed calculation section which calculates a vehicle body speed based on the detected wheel speed;
a slip ratio calculation section which calculates a slip ratio of the wheel based on the detected wheel speed and the vehicle body speed; and
a reference fluid pressure correction section which corrects the reference fluid pressure data pair so that the reference fluid pressure data pair decreases corresponding to an increase in the slip ratio.

5. The vehicular anti-lock control system according to claim 1, wherein the lower value of the reference fluid pressure data pair and the upper value of the reference fluid pressure data pair are determined by using said predetermined map based on a product of the road surface friction coefficient and the ground load of the wheel.

6. The vehicular anti-lock control system according to claim 5, wherein a slip ratio of the wheel comprises the ratio of a calculated vehicle body speed to the detected wheel speed of the wheel, and
wherein the lower value of the reference fluid pressure data pair is corrected by a correction value, the correction value obtained by using another predetermined map based on the slip ratio of the wheel.

7. The vehicular anti-lock control system according to claim 6, wherein the correction value is set to a value of 1 when the slip ratio is less than 5 percent, and is set to a value that approaches zero when the slip ratio is greater than or equal to 20 percent, wherein the correction value decreases linearly from 1 for values of the slip ratio between 5 percent and 20 percent.

8. The vehicular anti-lock control system according to claim 6, wherein the correction value is provided such that when the slip ratio is small, the lower value of the reference fluid pressure data pair is substantially unchanged by the correction value, and such that the lower value of the reference fluid pressure data pair decreases as the slip ratio increases.

9. The vehicular anti-lock control system according to claim 1, wherein a slip ratio of the wheel is determined based on the detected wheel speed and the vehicle body speed, and when the slip ratio is increasing in a predetermined range comprising the peak road surface friction coefficient, the road surface friction coefficient is updated based on the slip ratio.

10. The vehicular anti-lock control system according to claim 1, wherein the anti-lock control system further comprises a modulator for adjusting the braking force applied to the selected wheel, the modulator comprising:
a housing having an input port connected to a fluid pressure source, a release port communicating with a hydraulic fluid tank, and at least one output port, the housing also having a hollow bore formed therein with a an annular brake application groove extending therearound and communicating with the input port, and an annular fluid return groove extending around the hollow bore and communicating with the release port, said grooves being provided at axially spaced-apart positions;
a spool having an annular recess formed around a medial portion thereof and slidably disposed within the hollow bore of the housing, the spool having a first fluid passage formed therethrough and extending in a direction transverse to a longitudinal axis of the spool, and a second fluid passage formed therein extending in an axial direction, wherein the second fluid passage communicates with the first fluid passage, and extends from the first fluid passage to an end surface of the spool proximate the output port; and
a spring disposed in the hollow bore of the housing between the output port and the spool.

11. The vehicular anti-lock control system according to claim 1, wherein the anti-lock control device further comprises:
a vehicle body speed calculation section which calculates a vehicle body speed based on the detected wheel speed;
a target wheel speed calculation section that calculates a target wheel speed which is a target value for the wheel speed during anti-lock control, while taking into consideration a predetermined slip ratio in addition to the calculated vehicle body speed;
a slip ratio calculation section that calculates a slip ratio of the wheel based on the detected wheel speed and the vehicle body speed; and
the target fluid pressure calculation section calculates the target fluid pressure so as to correspond to a deviation of the wheel speed with the calculated target wheel speed, when it is determined that the calculated slip ratio of the wheel exceeds a predetermined threshold value and the wheel has a tendency to lock.

12. The vehicular anti-lock control system according to claim 1, wherein the anti-lock control device further comprises:
a wheel acceleration/angular velocity calculation section that calculates a wheel acceleration of the wheel as a differential value of the output of the wheel speed sensor and also calculates a wheel angular velocity by dividing the wheel speed by a wheel radius, and
a ground load calculation section that calculates a ground load W of the wheel by use of an equation: "$W=Wfl+G*(HG/LWB*WT*½)$", where Wfl is a static load of the wheel, HG is a height of center of gravity, LWB is a wheel base, WT is a weight of the vehicle, and G is the calculated wheel acceleration or an acceleration in a front/rear direction of the vehicle which is detected by an acceleration sensor mounted on the vehicle body.

13. A vehicular brake anti-lock control system comprising:
a modulator for adjusting a braking force applied to a selected wheel, the modulator comprising:
a housing having an input port connected to a fluid pressure source, a release port communicating with a hydraulic fluid tank, and at least one output port, the housing also having a hollow bore formed therein with an annular brake application groove extending therearound and communicating with the input port, and an annular fluid return groove extending around the hollow bore and communicating with the release port, said grooves being provided at axially spaced-apart positions;
a spool having an annular recess formed around a medial portion thereof and slidably disposed within the hollow bore of the housing, the spool having a first fluid passage formed therethrough and extending in a direction transverse to a longitudinal axis of the spool, and a second fluid passage formed therein extending in an axial direction, wherein the second fluid passage communicates with the first fluid passage, and extends from the first fluid passage to an end surface of the spool proximate the output port; and
a spring disposed in the hollow bore of the housing between the output port and the spool;

a wheel speed sensor which detects a wheel speed of the selected wheel; and an anti-lock control device which is operable to suppress locking of the wheel by controlling a target brake fluid pressure supplied to the selected wheel brake based on a reference fluid pressure data pair of upper and lower values of reference fluid pressures, when it is determined based on the wheel speed detected by the wheel speed sensor that the wheel has a tendency to lock, the reference fluid pressure data pair being selected by using a predetermined map;

wherein the antilock control device includes a target fluid pressure calculation section that calculates a target fluid pressure based on the detected wheel speed;

wherein the target brake fluid pressure is controlled to periodically increase and decrease based on detected wheel speed, wherein when the target brake fluid pressure becomes less than the lower value of the reference fluid pressure data pair the target brake fluid pressure is adjusted to coincide with the lower value of the reference fluid pressure data pair, and wherein when the target brake fluid pressure becomes greater than the upper value of the reference fluid pressure data pair, the target brake fluid pressure is adjusted to a value which lies between a pressure corresponding to an uncorrected target brake fluid pressure and a pressure corresponding to the upper value of the reference fluid pressure data pair and a rate of increase of the target brake fluid pressure is corrected so as to be smaller than in a case where the target brake fluid pressure is equal to or less than the upper value;

and wherein the anti-lock control device comprises:
    a ground load calculation section which provides at least one of detection and estimation of a ground load of the selected wheel;
    a road surface friction coefficient calculation section which provides at least one of detection and estimation of a road surface friction coefficient;
    a reference fluid pressure calculation section which calculates the reference fluid pressure data pair based on the ground load and the friction coefficient by using the predetermined map.

\* \* \* \* \*